UNITED STATES PATENT OFFICE.

FRANCISCO ESPAILLAT DE LA MOTA, OF SAN PEDRO DE MARCORIS, DOMINICAN REPUBLIC.

PROCESS OF PRESERVING EGGS.

1,229,592. Specification of Letters Patent. Patented June 12, 1917.

No Drawing. Application filed June 27, 1916. Serial No. 106,283.

*To all whom it may concern:*

Be it known that I, FRANCISCO ESPAILLAT DE LA MOTA, a citizen of the Dominican Republic, residing at San Pedro de Marcoris, in the Dominican Republic, have invented new and useful Improvements in Processes of Preserving Eggs, of which the following is a specification.

This invention relates to a process of preserving eggs, and its primary object is to provide a process of egg preservation by coating whereby a coating substance, containing ether or other odorous solvent may be employed, without liability of the odor of the solvent being absorbed by the egg with obvious objections.

A further object of the invention is to provide a process of preserving eggs whereby the egg may be provided with a coating to prevent evaporation of the moisture from the egg and the consequent spoiling of the egg, the coating also serving to keep the pores of the egg shell impermeable to air and liquids.

In carrying my invention into practice, I first clean the surfaces of the eggs in any suitable manner, and then place thereon a protective fatty coating. This fatty coating, which is placed in a receptacle, which may be termed receptacle number 1, consists of a mixture of lard, an edible oil, such as olive oil, and an agent designed to act as a perfuming means or to give an agreeable odor to the mixture. These ingredients are preferably combined in the proportions of about two parts, by weight, of the lard, to three parts of the edible oil, and sufficient of the essential oil to mix with and give odor to the fatty body. The eggs are dipped, one by one in this fatty mixture in receptacle number 1 and then removed from the fatty bath, the coating being allowed to harden thereon.

The eggs are next dipped into another receptacle, which may be termed receptacle number 2, containing a bath of a colloid solution, such as collodion, then removed and allowed to drain and exposed to the atmosphere to permit the collodion to harden. If desired, the eggs may be dipped a second time in the collodion to give a second coating, and if this is not sufficient for a specific purpose the coating process may be repeated any required number of times.

Ordinarily, the second coating of collodion is sufficient, and after thus being prepared the eggs may be packed in any suitable manner so as to be kept separate to permit the coated surfaces of the eggs being stored in a clean and cool place until used or shipped for sale or dispensing. The collodion forms an elastic coating which adheres closely to the surface of the egg and forms a protective covering which is impermeable to fluids and liquids and is not liable to be broken or otherwise injured, even when the egg is carelessly handled. This coating being prepared upon a fatty base, adheres smoothly to the base and keeps the base intact at all times until the protective surface of the egg is removed to permit the egg to be used.

The purpose of first preparing the egg by giving it a coating of a perfumed fat, is to prevent the ether or like solvent in the collodion giving a bad taste or odor to the egg, this being prevented first by the fatty barrier, and secondly by the action of the perfuming agent in overcoming any traces of the solvent which may be taken up by the egg. Furthermore, the fatty coating also assists in sealing the pores of the egg shell to prevent the drying out of the liquid contained in the egg and the admission of air through the pores of the shell. The collodion coating serves, first to prevent the passage of liquids or air, and secondly to protect the fatty coating and form an elastic impermeable covering which it not liable to become cracked or broken. The coatings jointly serve to prevent the evaporation of the moisture of the egg, which is the primary cause of decay, and, on account of the durability of the coating, the preservative treatment will last for a period of months without renewal or impairing the pristine quality of the egg.

I claim:—

1. The process of preparing eggs for preservation, which consists in providing the egg with a fatty coating, and then covering said fatty coating with an air and moisture proof protective coating.

2. The process of preparing eggs for preservation, which consists in providing the egg with a fatty coating containing a perfuming substance, and then covering said coating with an air and moisture proof protective covering.

3. The method of preparing eggs for preservation, which consists in coating the egg with a fatty mixture of lard and an edible oil combined with a perfuming substance, and enveloping the same with an air and moisture proof protective coating.

4. The process of preparing eggs for preservation which consists in coating the surface of the egg with a fatty substance, and then enveloping the same in an air and moisture proof impervious covering.

5. The process of preparing eggs for preservation which consists in first coating an egg with a perfumed fatty vehicle, and then coating the same with a colloidal substance.

In testimony whereof I affix my signature.

FRANCISCO ESPAILLAT DE LA MOTA,